Oct. 21, 1924.  1,512,661
L. ARNTZ
ADJUSTABLE NOSE PIECE FOR SPECTACLES AND EYEGLASSES
Filed Feb. 26, 1923
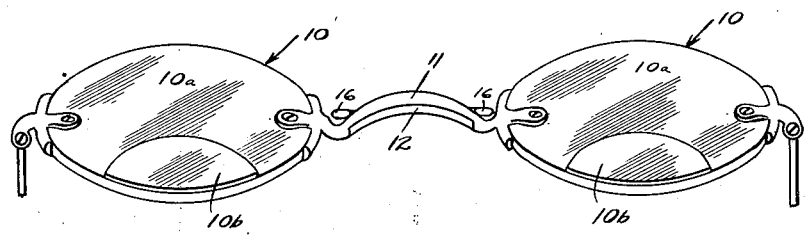
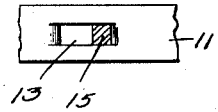 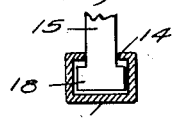 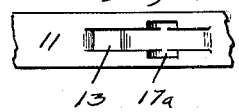
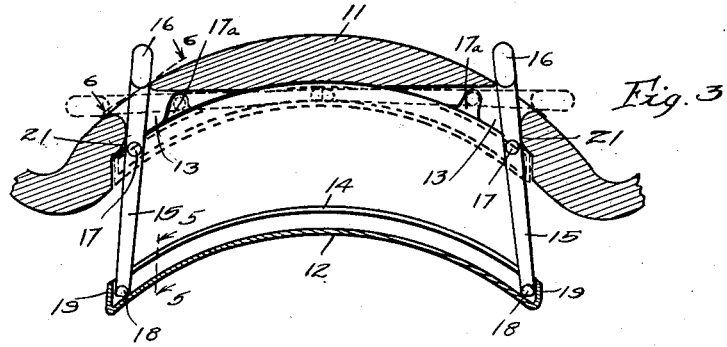
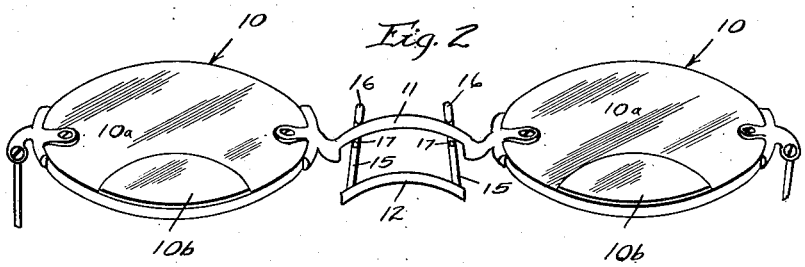
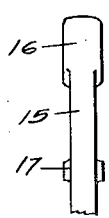
Inventor
Lew Arntz
By Bair & Freeman Attys
Witness
Lynn Latta Patented Oct. 21, 1924.

1,512,661

UNITED STATES PATENT OFFICE.

LEW ARNTZ, OF DES MOINES, IOWA.

ADJUSTABLE NOSE PIECE FOR SPECTACLES AND EYEGLASSES.

Application filed February 26, 1923. Serial No. 621,243.

*To all whom it may concern:*

Be it known that I, LEW ARNTZ, a citizen of the United States, and a resident of Des Moines, in the county of Polk and State of Iowa, have invented a certain new and useful Adjustable Nose Piece for Spectacles and Eyeglasses, of which the following is a specification.

The object of my invention is to provide an adjustable nosepiece or bridge for eyeglasses and spectacles of simple, durable and inexpensive construction.

Where the lenses used in spectacles and eyeglasses are of the bifocal type in which there are two distinct fields of vision, it is known that the glasses are usually adjusted so that the field of vision for far sight is above the field of vision for near sight. This is true because for near sight, one is more likely to look downwardly than for far sight.

However, it is also true that usually the nosepiece is not quite at the ideal height for using either of the fields of vision and is never at quite the right height for using both fields of vision with the greatest ease.

It is my purpose to provide in a nose piece, an adjustable device capable of movement to different positions, so as to raise or lower the glasses on the nose for increasing the convenience with which either field of vision can be used.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1 shows a perspective view of a pair of eye glasses equipped with an adjustable nosepiece embodying my invention.

Figure 2 shows a perspective view of a pair of eye glasses, with my adjustable nosepiece shown in its open position.

Figure 3 is an enlarged, sectional view taken through the nose-piece and my auxiliary nose-piece.

Figure 4 is a detail view of a portion of the nose-piece.

Figure 5 is a detail, sectional view taken on line 5—5 of Figure 3.

Figure 6 is a sectional view taken on line 6—6 of Figure 3; and

Figure 7 is a detail view of a portion of the adjustable device.

In the accompanying drawings, I have used the reference numeral 10 to indicate the lenses of a pair of spectacles, having in each instance the same field of vision $10^a$ for far sight and the field of vision $10^b$ for near sight.

The lenses 10 are connected by an ordinary nose-piece or bridge 11.

Adjustably supported on the nose piece 11 is an auxiliary nose-piece 12, which is so mounted on the nose-piece 11 as to be capable of adjustment to different positions.

The nose-piece 11 has spaced on opposite sides of its middle point longitudinally elongated holes 13.

The auxiliary nose-piece 12 has substantially the form of a channel-shaped member, as shown for instance in Figures 3 and 5, opening upwardly and having at its open side the overhanging flanges 14.

Slidably extended through the respective holes 13 are the adjusting members 15, which are preferably angular in cross-section so that they may slide freely in the slots 13, but will not rotate therein.

The adjusting members 15 have above the nose-piece 11 the heads 16 and below the nose-piece 11 the stop lugs 17.

On the lower ends of the adjusting members 15 are laterally extending portions 18 arranged to slide in the auxiliary nose-piece 12.

At its ends, as at 19, the auxiliary nose-piece 12 is closed, so as to prevent the accidental escape of the ends of the adjusting members 15 from the noise-piece 12.

The heads 16 and stops 17 are spaced apart far enough to permit the adjusting members 15 to swing from position shown in Figure 1 to position shown in Figure 2.

The stops 17 when the parts are in their normal position are received in notches $17^a$ formed in the sides of the openings 13 in the nose piece 11. The nose piece 11 is provided with a cut away portion in which the auxiliary piece 12 is received when in its normal position.

The adjusting members 15 fit the slots or the openings 13 snugly so that there is sufficient frictional engagement between the parts to cause the members 15 to be held in any position, which they may be given.

When the wearer of the spectacles is using the field of vision 10ª, the auxiliary nose-piece 12 is adjusted by swinging the upper ends of the members 15 outwardly, as shown in Figure 1, for thus holding the auxiliary nose-piece 12 in its upper position.

If the wearer desires to use the field of vision 10ᵇ, he grasps the heads 16 between his fingers and swings them toward each other. The extensions 18 then slide in the channel-shaped auxiliary nose-piece 12 to their positions illustrated in Figure 2.

The shape and arrangement of the holes 13 is such that when the nose-piece 12 is in its lower adjusted position, the members 15 engage the walls around the holes 13 at the lower parts of the holes and at the upper parts of the holes, as at 20 and 21, and when the glasses are in use, their weight tends also to hold the nose-piece 12 in its lower adjusted position with an adjustable structure, such as herein illustrated.

The expert who fits the glasses can fit them, so that they are adjusted at the proper height with relation to the eye for best use of the far sight field of vision, and with the auxiliary nose-piece 12 in its upper position of adjustment.

When the wearer then desires to use the field of vision 10ᵇ, he can readily lower the auxiliary nose-piece with relation to the nose-piece 11, so that the spectacles will then rest on the nose in the most convenient and comfortable position for the use of the latter field of vision.

The added convenience of having the lenses at exactly the right height with relation to the eyes for using the fields of vision 10ª or the fields of vision 10ᵇ, as the case may be, will be observed from the statement of the problem.

It is to be noted that when the auxiliary nose piece is in its raised position, the adjusting members 15 are largely concealed in the channel formed by the former, so that the appearance of the device is neat. On movement to open position, the adjusting members 15 swing past center, and will remain in place till purposely moved.

It is obvious that various means might be employed for adjusting the auxiliary nose piece and it is not my intention to limit myself to the particular form of structure here shown, but I desire to cover by my claims, such modified forms of structure or use of mechanical equivalents, as may be reasonably included within their scope.

I claim as my invention:

1. In a nose piece structure for spectacles and the like, a nose piece, an auxiliary nose piece, members having a pivotal connection with the nose piece and a sliding pivotal connection with the auxiliary nose piece, whereby the auxiliary nose piece may be adjusted toward or from the first-named nose piece.

2. In a nose piece structure for spectacles and the like, a nose piece, an auxiliary nose piece, members having a loose pivotal connection with the nose piece and a pivotal connection with the auxiliary nose piece, whereby the auxiliary nose piece may be adjusted toward or from the first-named nose-piece.

3. In a nose-piece structure of the class described, a nose-piece, an auxiliary nose-piece, members having a loose pivotal connection with the nose-piece and a sliding pivotal connection with the auxiliary nose-piece, whereby the auxiliary nose-piece may be adjusted toward or from the first-named nose-piece.

4. In a nose-piece structure, a nose-piece having spaced holes therein, an auxiliary nose-piece, adjustment members having portions having a loose sliding and pivotal mounting in said holes, said adjusting members having loose slidable and pivotal mounting on said auxiliary nose-piece, and means for limiting the movement of the adjusting members in said holes.

Des Moines, Iowa, February 15, 1923.

LEW ARNTZ.